US006278528B1

(12) United States Patent
Ohtsuka et al.

(10) Patent No.: US 6,278,528 B1
(45) Date of Patent: *Aug. 21, 2001

(54) COMPUTER-READABLE RECORDING MEDIUM STORING PHOTOGRAPHIC PRINTER DRIVER PROGRAM

(75) Inventors: Shuichi Ohtsuka; Nobuyoshi Nakajima, both of Kanagawa-ken; Norihisa Haneda, Saitama-ken; Kazuo Shiota, Tokyo; Shinji Itoh, Kanagawa-ken, all of (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/066,821

(22) Filed: Apr. 28, 1998

(30) Foreign Application Priority Data

Apr. 28, 1997 (JP) .................................................... 9-110539
Apr. 17, 1998 (JP) ................................................. 10-107708

(51) Int. Cl.[7] ........................................................ B41B 7/28
(52) U.S. Cl. ........................................... 358/1.15; 358/296
(58) Field of Search ........................... 382/319; 358/1.13, 358/1.14, 1.15, 1.16, 1.9, 1.1, 296

(56) References Cited

U.S. PATENT DOCUMENTS

| 4,169,275 | * | 9/1979 | Gunning | 358/300 |
| 5,057,913 | * | 10/1991 | Nagata et al. | 347/232 |
| 5,113,351 | * | 5/1992 | Bostic | 700/236 |
| 5,768,487 | * | 6/1998 | LeClair et al. | 358/1.17 |
| 5,784,610 | * | 7/1998 | Copeland, III et al. | 707/104 |
| 5,799,206 | * | 8/1998 | Kitagawa et al. | 358/1.15 |
| 5,828,461 | * | 10/1998 | Kubo et al. | 382/319 |
| 5,838,457 | * | 11/1998 | Umemoto | 358/302 |
| 5,930,810 | * | 7/1999 | Farros et al. | 707/506 |

FOREIGN PATENT DOCUMENTS 9-149271   6/1997 (JP) .

\* cited by examiner

Primary Examiner—David Moore
Assistant Examiner—King Y. Poon

(57) ABSTRACT

In the form of print ordering wherein photograph image data are recorded in a recording medium and brought in to a photographic service provider, a customer can specify on a personal computer a variety of printing conditions for a photographic printer installed in the photographic service provider. A printer driver for the photographic printer of the photographic service provider is installed in a personal computer of a customer. The printer driver receives an input specifying the variety of printing conditions by displaying a printing condition setting screen on a monitor of the personal computer via image processing application software. The image processing application software converts resolution upon necessity in response to the printing conditions, transfers the image data after the conversion and an image of a print paper, both of which are then displayed on a finish confirmation screen by the printer driver. If a confirmation result is OK, the printer driver records the specified printing conditions as ordering information in a recording medium or transfers the ordering information to a network.

32 Claims, 10 Drawing Sheets

COMPUTER-READABLE RECORDING MEDIUM STORING PHOTOGRAPHIC PRINTER DRIVER PROGRAM

BACKGROUND OF THE INVENTION

1. Field of the Invention

The present invention relates to a driver program for a photographic printer (hereinafter called a printer driver). More specifically, the present invention relates to a printer driver which enables a customer to configure a personal computer to recognize a variety of conditions related to a printer, such that the customer requests print output by providing an order file describing the content of photographic print and image data to be printed to a photographic service provider via a recording medium such as a Zip disc or via a network.

2. Description of the Related Art

A wide variety of application software, such as Adobe Photoshop, has been developed. Furthermore, scanners and digital cameras have been used to input photograph data into a personal computer to be processed by application software, such as the Adope Photoshop mentioned above, to enable generation of photograph postcards, calendars and stickers by outputting the photograph using a dye-sublimation printer or a inkjet printer. However, a photograph image output by an inexpensive printer such as the one used in a general home is obviously inferior to ordinary photographic print in terms of photograph quality (such as color or resolution).

Meanwhile, a conventional service has been made available for generating photograph postcards or the like having the same high quality as a photographic print printed by a high performance high resolution photographic printer. Such a service generally requires a film or photographic print to be physically delivered to a photographic service provider, where the desired processing (such as an area to be trimmed) is specified. Therefore, it has not been possible to process a photograph as freely as by using a personal computer.

Because of the recent progress in digitization in the field of photographic services, it is now possible to place an order for printing using photograph data stored on a recording medium that is physically delivered to the photographic service provider. For instance an MO disc, image data read from a film and may be recorded on a Zip disc, or a CD-R, that is delivered by the user to the photographic service provide in lieu of film. Likewise, when recording mediums are used, it may be possible to also provide ordering information as digital data to the photographic service provider, eliminating the need for a customer to physically deliver such information to the photographic service provider in the form of an order sheet.

When ordering using recording image data and ordering information in a recording medium that is delivered to a photographic service provider, it is possible to generate a high quality output based on digital image data processed by a customer on a personal computer using a high performance high resolution photographic printer installed in the photographic service provider.

However, the processed image data are different from image data read from a film and may not be printed as they are by a photographic printer. For example, upon ordering a postcard, there are roughly two ways of printing a postcard based on image data that has been processed and provided by a customer with a size larger than the postcard size. One method is to print after reducing the size of the image data so that the image represented by the image data fits in the postcard size. The other is to trim a portion of the image and print the area within the postcard size.

In this case, it is up to the customer to decide which of the methods is adopted. It is not preferable that an operator or the like in a laboratory decides it without input from the customer. Therefore, it is necessary to ask in advance the customer to confirm which of the methods is adopted.

In the case of image data recorded by a digital camera, regardless of whether or not the image data has been manipulated by the customer using a personal computer or the like, printing conditions for a photographic printer may not be met since the aspect ratios of the image data generated by the digital camera may not be the same as the aspect ratio of an ordinary photograph generated by a printing device. In this case, upon printing, it is also necessary to confirm a customer's intention in advance.

SUMMARY OF THE INVENTION

Based on consideration of the problems described above, an object of the present invention is to provide means which enables a customer to specify a variety of printing conditions for a photographic printer by using a personal computer to develop an ordering form, wherein photograph image data and ordering information are recorded in a recording medium and printing is requested by bringing the recording medium to a photographic service provider.

To this end, the present invention provides a photographic printer driver operating on a personal computer in the form of a computer-readable recording medium storing the printer driver. However, the printer driver does not transfer signals directly to a printer as in the case of a printer driver for a printer directly connected to a personal computer, but records information regarding setting of the printer in a file and changes the printing conditions by transferring the file to a photographic printer.

In other words, when print output of photograph image data is requested by transferring the photograph image data and an order file describing the content of an order for printing the photograph image data to a photographic printer via a recording medium or a network, the present invention executes a printing condition specifying function for specifying printing conditions for the photographic printer using a computer-readable recording medium having photographic printer driver. The printer driver is a program whereby the computer executes a printing condition displaying function which displays on a display apparatus printing conditions acceptable by the photographic printer and a printing condition recording function which describes at least a portion of the printing conditions specified by the printing condition specifying function as a portion of the content of the order in the order file.

It is preferable that the printing condition specifying function specifies the printing conditions before the transfer.

Furthermore, it is preferable for the driver program of the present invention to include a printing condition accepting function which enables input of printing condition specification from an input device.

Since the above printer driver is preferably a program operating on a personal computer or the preferred like, the "display apparatus" is a monitor of the personal computer, and preferred the "input device" is only kind of equipment known as an input device for a personal computer, such as a keyboard or and a mouse.

The "transfer" via a recording medium preferably involves reading from a recording medium after photograph image data and the like have been recorded in the recording medium by a personal computer. In this case, "before the transfer" generally refers to the time before the recording in a recording medium is carried out.

The "photographic printer" used in the above ordering form is meant to include a function to read the order file from the medium and to carry out print output based on the order file. The order file accepting function may be realized by the printer itself or by peripheral equipment connected to the printer.

"The printing conditions" include the size of photographic print, orientation thereof, a quality of a print paper, and the like. In the case where the specified size of the print paper is not the same as the image size, the printing conditions further include enlargement or reduction carried out in a fixed aspect ratio, enlargement or reduction carried out after changing the aspect ratio, no enlargement or reduction (which leads to a portion of the image being trimmed or a marginal blank appearing on the print), or whether or not a white margin is preferred to appear on the print. Furthermore, in the case of no enlargement or reduction, the portion to be trimmed or the size of the blank if the blank is left are also included in the printing conditions.

"The printing condition displaying function" includes the function to make the driver program itself display the printing conditions, as well as the function to exchange necessary data with application software installed in the personal computer wherein the driver program has been installed, in order to let the application software display the printing conditions.

"The printing condition recording function" is generally a function used to notify the photographic printer of the specified printing conditions and to record the specified printing conditions as ordering information in the order file which will be input to the photographic printer and processed thereby.

It is preferable that the driver program of the present invention includes an image data converting function which converts, based on the printing conditions having been specified, the photograph image data so that the photograph image data become suitable for the printing conditions.

When a print paper size has been specified as the printing condition, for example, to "convert the photograph image data so that the image data become suitable for the printing conditions" generally involves converting resolution of the photograph image data so that the image represented by the image data fits in the size of the print paper. Furthermore, color conversion or sharpness processing may be carried out upon necessity. The image data converting function may be incorporated into the driver program as in the present invention. However, if the computer or the photographic printer comprises the image data converting function, it is not necessary for the driver program of the present invention to comprise the image data converting function.

Depending on the kind of the printing conditions, the finish of a photograph may not be the same as the image a customer has in its mind, regardless of the fact that the customer itself has specified the printing conditions. For example, in the case where a portion of an image has been cut, it is possible that the portion having been cut happens to be slightly different from the portion imagined by the customer.

Therefore, for some printing conditions, it is preferable to place an order after confirming an anticipated finish based on the setting of the printing conditions.

In other words, it is preferable for the printer driver to have a finish confirmation function which enables confirmation of the anticipated finish image of photographic print by displaying photograph image data having been converted by the image data converting function with an image of a print paper overlapping the image data on the display apparatus. In this manner, a customer can confirm the finish on his/her personal computer after setting the printing conditions, and set the printing conditions again if the finish does not seem satisfactory. By repeating this processing several times until the customer is satisfied with the finish, precise data for generating photographic print desired by the customer can be transferred to the photographic printer.

On this occasion, if the decision as to whether or not the confirmation by using the finish confirmation function is actually carried out is up to a customer, some customers naturally place orders without the confirmation. In this case, it is still possible that a finish meeting customer's expectations is not obtained, and difficulties may result between the customer and a photographic service provider. So prevent such a difficulties from occurring, image data or an order file may be transferred to the photographic printer only after a customer confirms (for example, by pressing a button) the anticipated finish image displayed on the display apparatus, regardless of whether or not the customer wants to confirm.

This function is realized by making the finish confirmation function display on the display apparatus photograph image data after the conversion by the image data converting function with an image of a print paper overlapping the image data, when the recording in a recording medium or the transfer to a network is ordered.

By installing the program recorded in the recording medium of the present invention into a personal computer, the functions which display the printing conditions and describe in an order file at least a portion of the printing conditions having been specified based on the displayed printing conditions are realized. Therefore, the printing conditions the customer has been specified are transferred to the photographic printer with more precision and photographic print meeting the customer's expectations can be generated. Furthermore, a photographic service provider does not need to spare its time on confirming a customer's intention when the photographic service provider has accepted image data which cannot be processed as they are.

Furthermore, by the function which enables printing condition specification input from the input device, the customer can specify desired printing conditions easily, and an image the customer has in its mind can be conveyed to the printer more precisely.

Moreover, by the function which converts photograph image data based on the specified printing conditions so that the image data become suitable for the printing conditions, the customer's image can be conveyed to the printer more precisely and photographic print meeting the customer's expectations can be generated.

At this time, if the program comprises the function which displays an anticipated finish, a customer can specify the printing conditions again and again until he/she satisfies with the finish while looking at it. Therefore, the image the customer desires can be conveyed more precisely, which leads to reduction in complaint about a finish.

Moreover, if an anticipated finish is always displayed immediately before image data are written in a zip disc or the like or transferred to a photographic service provider via a network, a customer confirms the anticipated finish without fail. Therefore, a trouble between a customer and a photographic service provider can be avoided when complaint regarding the finish emerges.

DESCRIPTION OF THE PREFERRED EMBODIMENT

Hereinafter functions of a printer driver recorded in a recording medium of the present invention and a photographic print order processing system using these functions will be explained with reference to the accompanying drawings.

Figure 1:
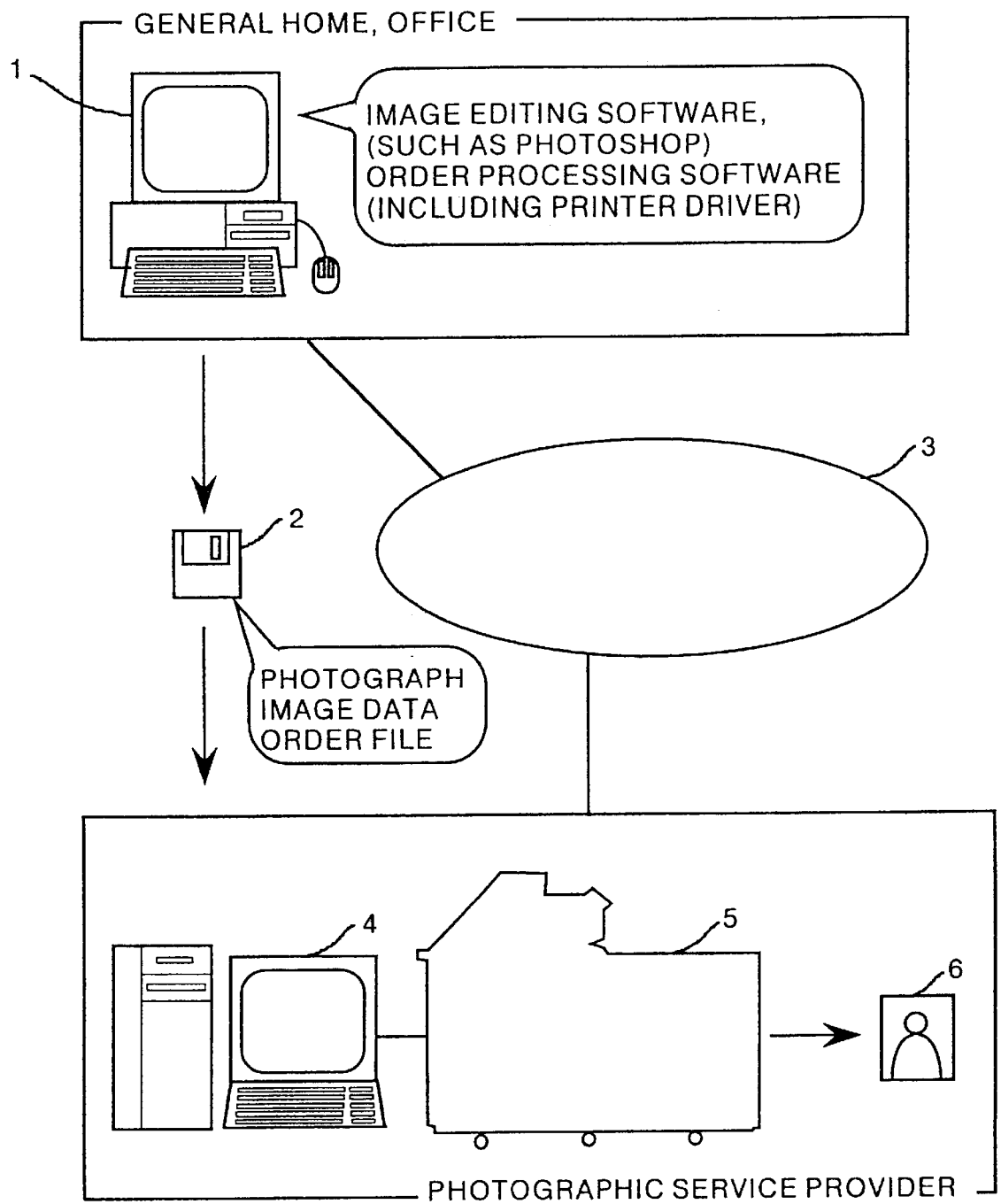
FIG. 1 is a diagram showing an example of a photographic print order processing system.

FIG. 1 shows a configuration of the order processing system. As shown in this figure, this system is configured by a personal computer 1 of a customer installed in a general home or an office, a variety of equipment 4 and 5 installed in a photographic service provider for outputting print, and a recording medium 2 or a network 3 for exchanging data between the two party.

In this system, image data to be printed and an order file describing the content of an order regarding the image data are generated by the personal computer 1 installed at a customer's home or an office. The processing for generating the order file is carried out by using software for order processing provided by the photographic service provider or the like.

This software is to input, on a screen of the personal computer, information regarding the name and address of an orderer, the phone number thereof, the frame number of an image to be printed (an image file name), the quantity and the size of print, and so on, all of which have been written conventionally on an order sheet used for ordering printing. Based on the information having been input, this software generates digital data in a format predetermined by the system, that is, the order file.

Figure 2:
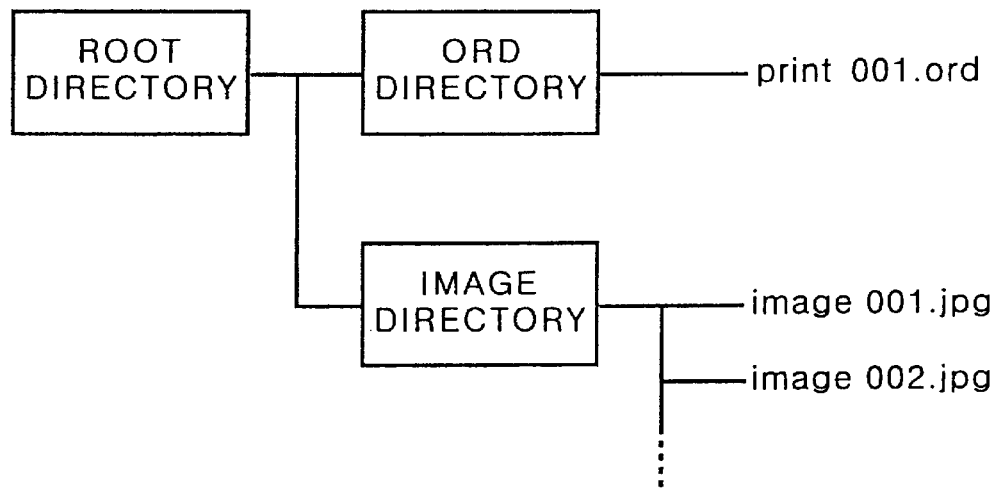
FIG. 2 is a diagram showing an example of an order file and image data recorded in separate files.
Figure 3:
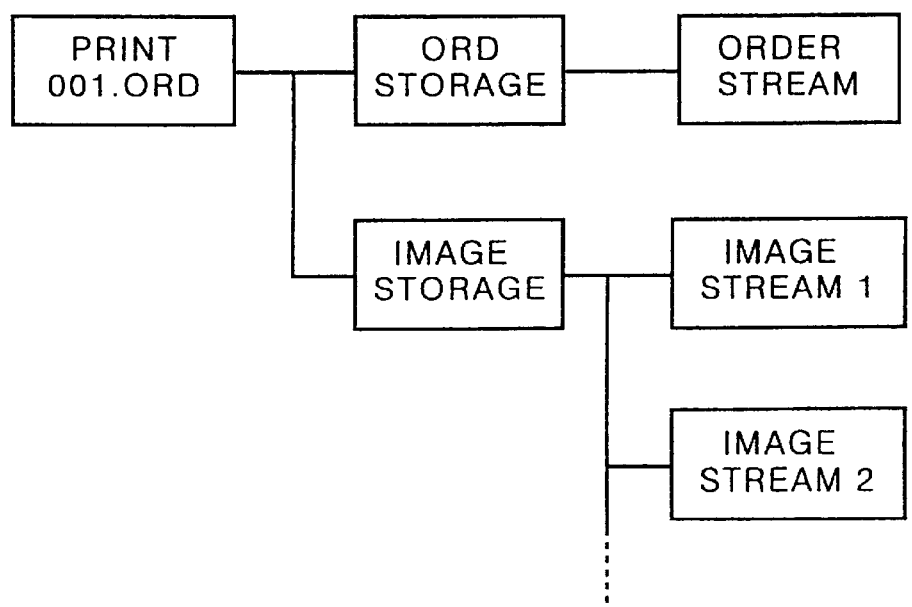
FIG. 3 is a showing an example of an order file and image data recorded in one file.

The generated order file and image data to be printed are recorded in the recording medium 2 for order processing, and handed to the photographic service provider. Alternatively, in an environment wherein the network is available, the image data and the order file may be handed to the photographic service provider by transferring them from the personal computer 1 of the customer via the network 3. The order file and the image data may be stored in separate files. Alternatively, the order file may include the image data. In other words, as shown in FIG. 2, an order file (print001.ord) and image data files (image001.jpg, image002.jpg...) may be stored in separate files under an ord directory and an image directory. Alternatively, as shown in FIG. 3, the content of an order may be stored in an order stream under an ord storage of the order file (print001.ord), and image data may be stored in an image stream 1, an image stream 2 and so on under an image storage of the order file.

The photographic service provider has an order receiving machine 4 which receives the order file and the image data by reading the recording medium 2 or connecting itself to the network 3, and a photographic printer 5 which carries out print output of the image data. The order receiving machine 4 is a general purpose personal computer comprising an apparatus for driving the recording medium 2, and a dedicated order receiving program is installed therein. The photographic printer 5 is a known digital photographic printer. The recording medium 2 means a floppy disc, a Zip disc, a CD-R, a PC card, an SSFDC, a Compact Flash, an MO disc, a picture MD, or the like.

In this system, the photograph image data to be printed may be obtained by reading developed film by using a film scanner, by reading a photographic print by using a reflection type scanner, or by direct input from a digital camera to the personal computer. Reading by a scanner can be carried out by a customer itself. The photographic service provider also has a service to output photograph image data in a Zip disc or the like upon generating first print, for example.

The customer can carry out processing such as combining the image data with characters or illustrations, or trimming of the image represented by the image data, by using software available on the market, such as Photo Factory (by Fuji Photo Film Co. Ltd.), Adobe Photoshop or Adobe Illustrator (both by Adobe Systems Inc.), or the like. The above image data having been processed can be printed as well.

Image data generated by a photographic service provider are generally in a size printable by the photographic printer of the service provider. However, image data having been processed by the above software or having been taken in from a digital camera may not be printed as they are, because of different aspect ratios or the like. The printer driver which will be described below originally aims to convert such image data to image data suitable for the printing conditions. However, upon a customer's request, it can perform conversion processing which is the same as has been described above on image data which can be printed as they are.

Hereinafter, embodiments of the processing carried out by a computer by using a printer driver of the present invention will be explained specifically.

First Embodiment

Figure 4:
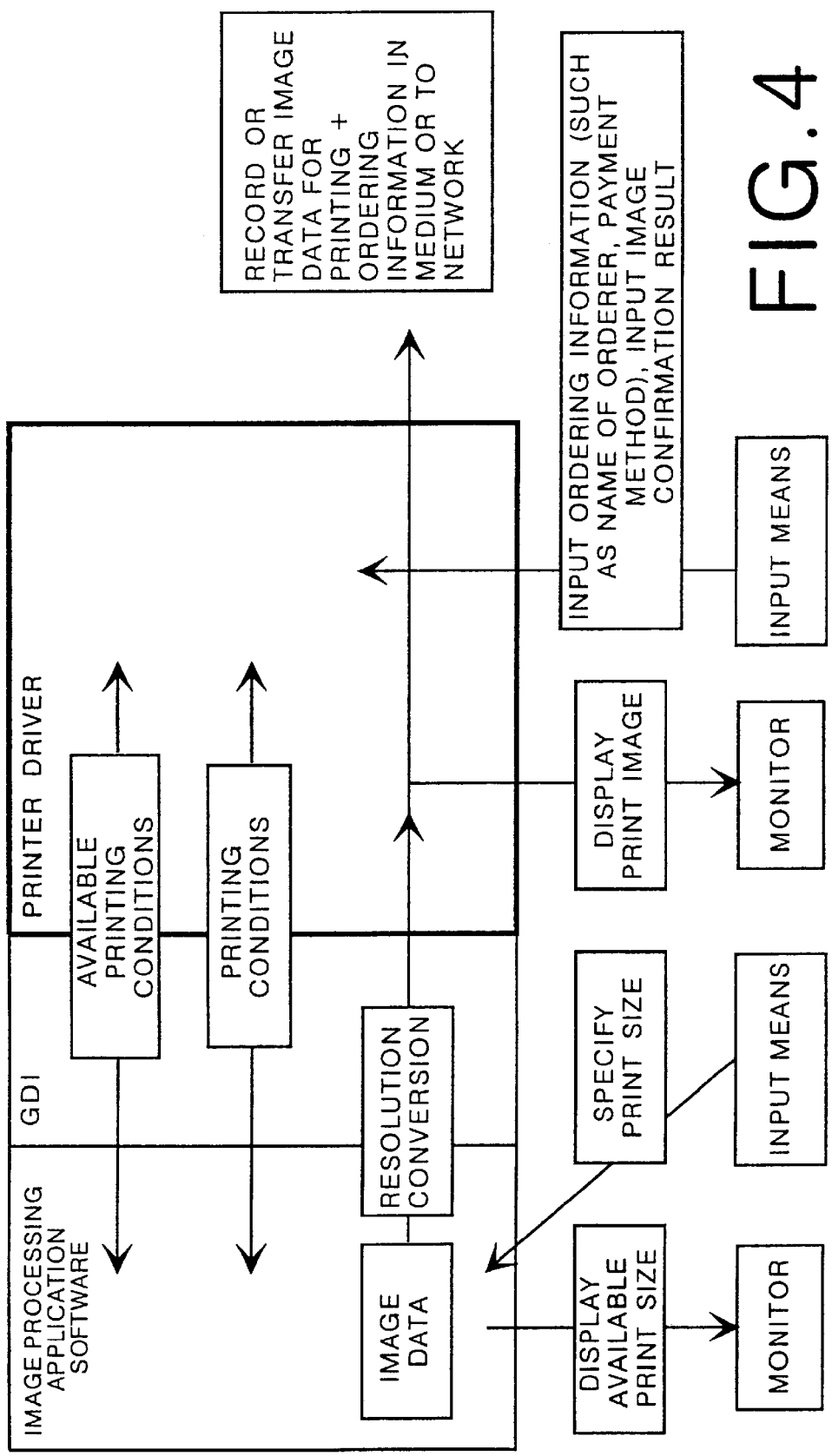
FIG. 4 is a block diagram showing an outline of processing by a printer driver in a first embodiment.
Figure 5:
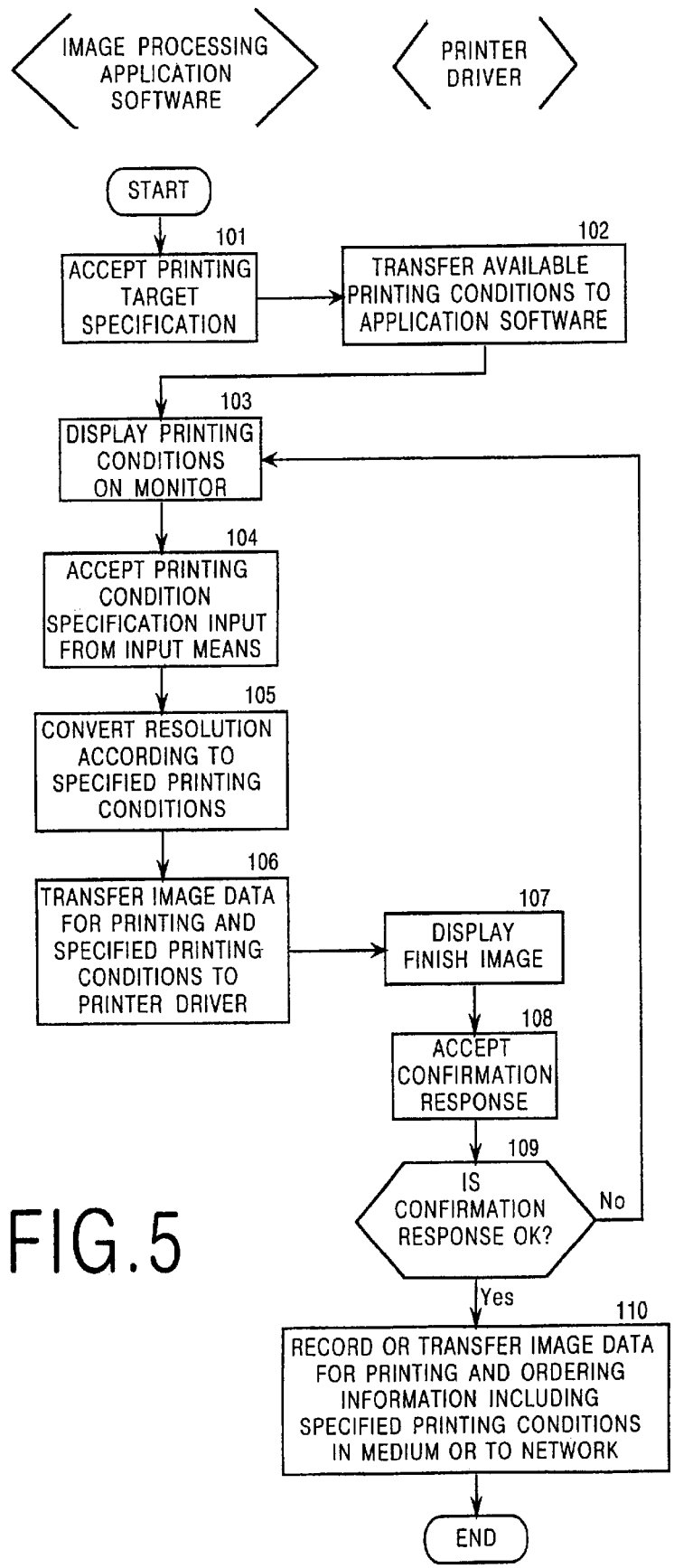
FIG. 5 is a flow chart showing the processing by the printer driver in the first embodiment.

FIG. 4 is a block diagram showing an outline of processing carried out in a first embodiment of a printer driver recorded in a recording medium of the present invention. FIG. 5 is a flow chart showing the processing. As shown in FIG. 4, the printer driver installed in a personal computer 1 and image data processing application software exchange data via a Graphical Device Interface (GDI: an interface for data exchange between image processing application software and a printer driver).

Figure 6:
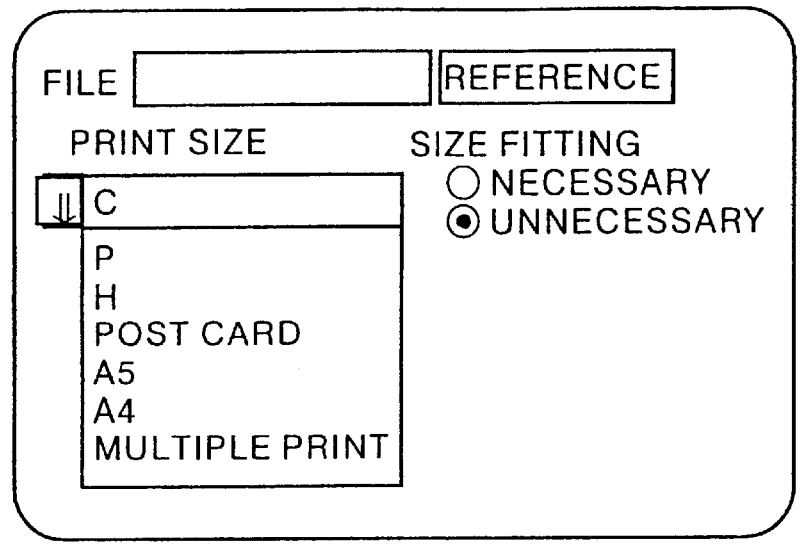
FIG. 6 is a diagram showing printing conditions displayed on a monitor.

In a step 101, the image processing application software accepts printing target specification from an input device such as a keyboard or a mouse, which is transferred to the printer driver. The printer driver transfers available printing conditions to the image processing application software (step 102). The image processing application software displays the transferred printing conditions on a monitor (step 103), and accepts printing condition specification input from the input means (step 104). On the monitor, as shown in FIG. 6, a screen (or a window) such as a printing condition setting screen 7 is displayed. In the example shown in FIG. 6, sizes such as C, P, H, postcard, A5, A4, and multiple print for generating business cards or stickers are displayed as choice of print size. On this screen, only sizes available at the photographic service provider, that is, sizes which can be set as a setting condition of a photographic printer, are displayed. The print size is input by using the input means. Furthermore, in this setting screen 7, choice is displayed as to whether or not size fitting is carried out by enlargement or reduction in the case where the specified size is different from the size of the image to be printed, or the aspect ratios thereof are not the same. It is also possible to specify trimming or rotation of the image represented by the image data upon printing.

Furthermore, as a specific method for size fitting, choice is displayed (not shown in FIG. 2) regarding whether or not enlargement or reduction is carried out, whether a fixed aspect ratio or a changed aspect ratio is used if it is carried out, whether or not a white margin is preferred, the width of the margin if the margin is desired, and the like. The customer can select and specify the desired conditions by using the keyboard or the mouse while looking at the printing condition setting screen 7.

Once the specification is completed, the printer driver converts resolution of the image data to be printed according to the specified printing conditions if the size fitting is specified, for example (step 105). The specified printing conditions and the image data for printing are transferred to the printer driver (step 106). In the case of image data becoming blurry by the resolution conversion, sharpness conversion may be carried out as well. Alternatively, color conversion or sharpness conversion may be carried out according to printer characteristics. Moreover, when trimming has been specified on this occasion, resolution of the image data may be converted and image data corresponding to the area to be printed alone may be extracted as the image data for printing.

Figure 7:
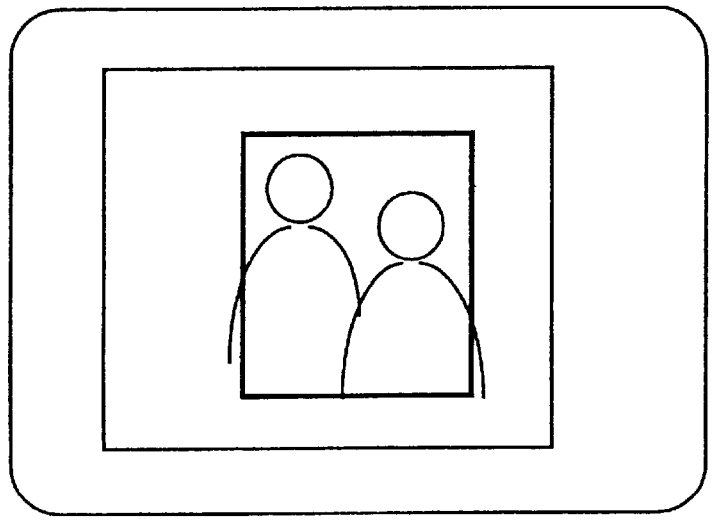
FIG. 7 is a diagram showing a finish image displayed on the monitor.

The printer driver displays the image data 9 for printing after the conversion, together with a print paper image 10 on a finish confirmation screen 8, as shown in FIG. 7 (step 107). For example, the example shown in FIG. 7 is for the case where size fitting is not specified but trimming of the periphery is specified.

The customer inputs a confirmation response by using the keyboard or the like while looking at the finish confirmation screen 8. Ordering information such as the name of an orderer and a payment method may be input as well. The printer driver accepts this response (step 108) and judges whether or not the confirmation result is OK (step 109). If the confirmation result is OK, the printer driver records in the recording medium 2 or transfers to the network 3 the image data for printing and the ordering information including the specified printing conditions (step 110). If the confirmation result is not OK, the processing goes back to the step 103 again, and the printer driver displays the printing condition setting screen 7 so that the customer can specify the printing conditions again. On this occasion, in order to modify relative positions between image data and the print paper (the area to be printed) more easily, the printing conditions may be set again in a manner such that the frame of the print paper image 10 on the finish confirmation screen may be handled directly by the mouse.

In the present embodiment, the ordering information is not written in the recording medium without the confirmation by the customer by using the finish confirmation screen 8. In this manner, difficulties between a customer and a photographic service provider regarding whether or not the confirmation has been carried out are prevented from happening.

The printing conditions recorded in the order file as the ordering information by the function of the printer driver is interpreted by an order receiving machine 4 shown in FIG. 1. The order receiving machine 4 changes the setting conditions of a photographic printer 5 according to the printing conditions and orders print output of the photograph image data. In this manner, the photograph image data are output under the printing conditions specified by the customer. In the case of a photographic printer comprising an order accepting function, the printer itself changes the setting thereof based on the printing conditions having been specified.

As has been described above, by using the photographic printer driver recorded in the recording medium of the present invention, upon processing an order for photographic print, a customer can set desired printing conditions for the photographic printer installed in a photographic service provider as for a printer of his/her own. As a result, photographic print which meets the customer's expectations can be obtained. Furthermore, if the printer driver is used, a photographic service provider will not receive image data which will not be printed as they are. Therefore, the photographic service provider can process an order promptly without sparing its time on confirming a customer's intention or the like.

Second Embodiment

A second embodiment of the present invention will be explained next.

Figure 8:
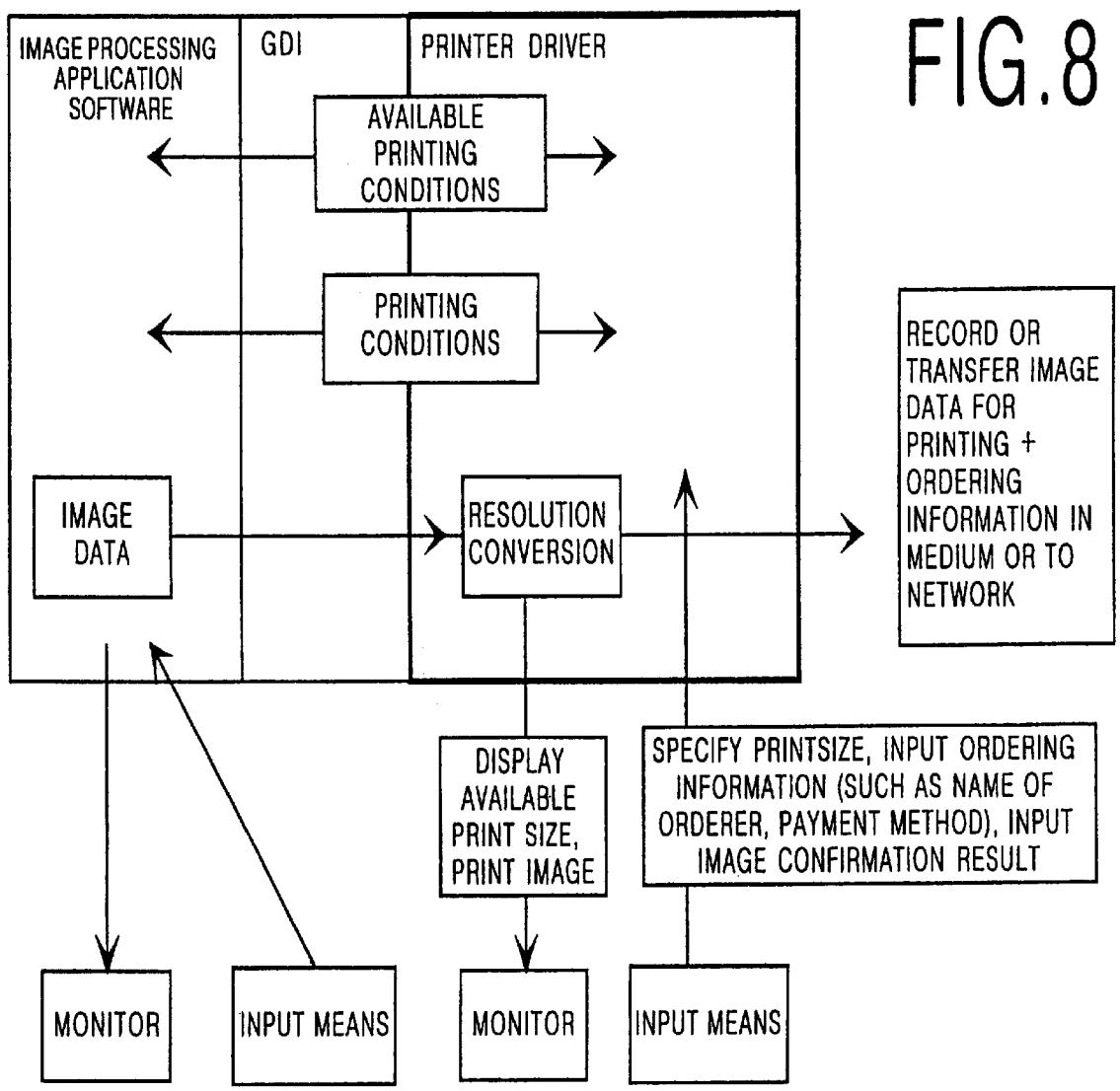
FIG. 8 is a block diagram showing an outline of processing by a printer driver in a second embodiment.
Figure 9:
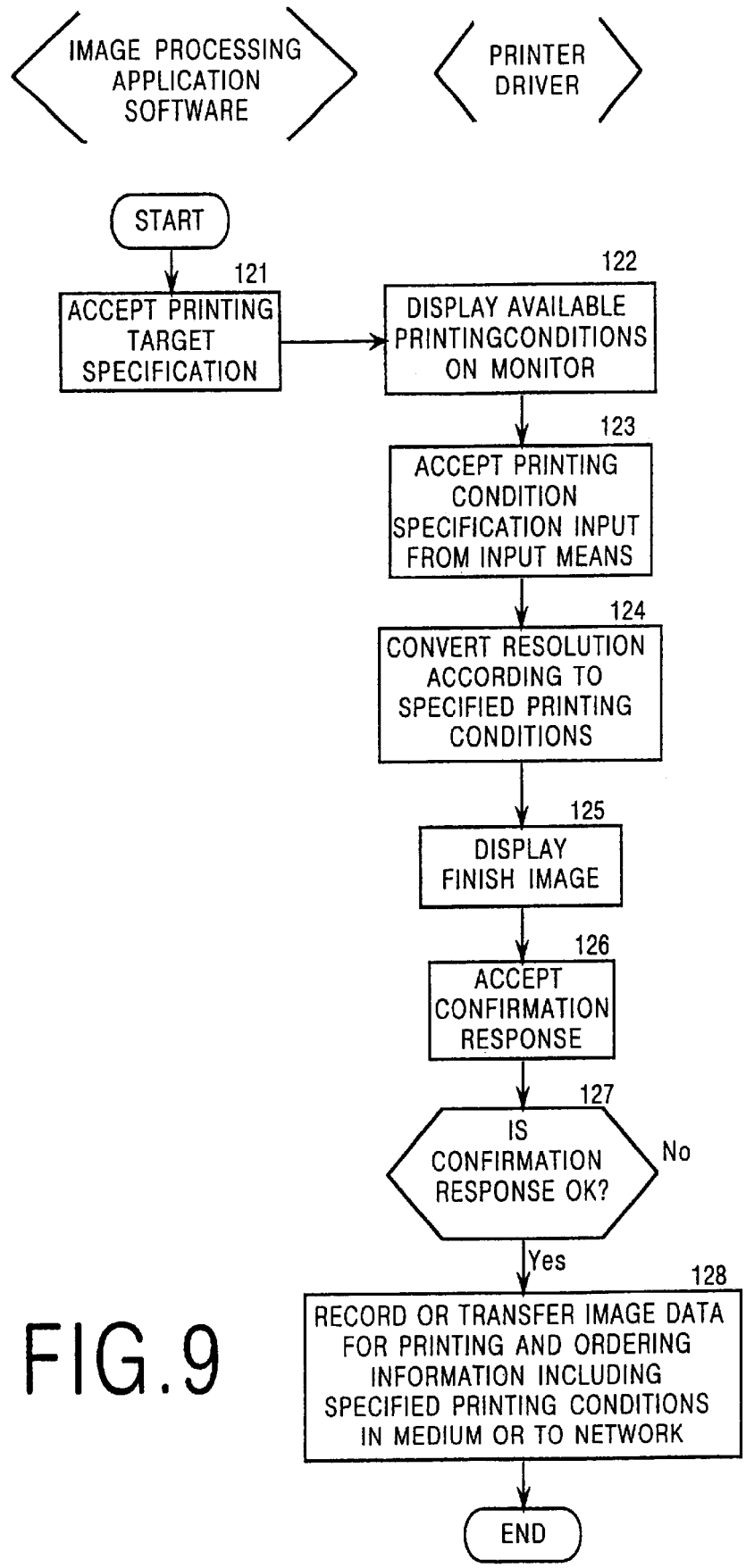
FIG. 9 is a flow chart showing the processing by the printer driver in the second embodiment.

FIG. 8 is a block diagram showing an outline of processing carried out in the second embodiment of a printer driver recorded in a recording medium of the present invention. FIG. 9 is a flow chart showing the processing. In the second embodiment, resolution conversion of image data in response to printing conditions is carried out by the printer driver, which is the difference from the first embodiment.

At a step 121, image processing application software accepts specification of a printing target from a input device such as a keyboard or a mouse, which is transferred to the printer driver. The printer driver displays available printing conditions on a monitor, as shown in FIG. 6 (step 122). The printer driver then accepts printing condition specification input from the input device (step 123).

Once the specification has been completed, image data for printing are obtained (step 124) by resolution conversion of the printing target image data transferred from the image processing application software according to the specified printing conditions, if size fitting has been specified, for example. As in the case of the first embodiment, sharpness conversion may be carried out as well, if the image represented by the image data becomes blurry after the resolution conversion. Furthermore, color conversion or sharpness conversion according to characteristics of a printer may be carried out. If trimming has been specified, the resolution of the image data may be converted and image data corresponding to the area to be printed may be extracted as the image data for printing.

The printer driver displays image data 9 for printing and an image 10 of a print paper on a finish confirmation screen 8, as shown in FIG. 7 (step 125).

A customer inputs a confirmation response using the input device while looking at the finish confirmation screen 8. Ordering information such as the name of an orderer and a payment method may be input as well on this occasion. The printer driver accepts the input (step 126) and judges whether or not the confirmation result is OK (step 127). If the confirmation result is OK, the image data for printing and the ordering information including the specified printing conditions are recorded in a recording medium 2 or transferred to a network 3 (step 128). If the confirmation result is not OK, the processing goes back to the step 122 and the printing condition setting screen 7 is displayed so that the customer can specify again.

Third Embodiment

A third embodiment of the present invention will be described below.

Figure 10:
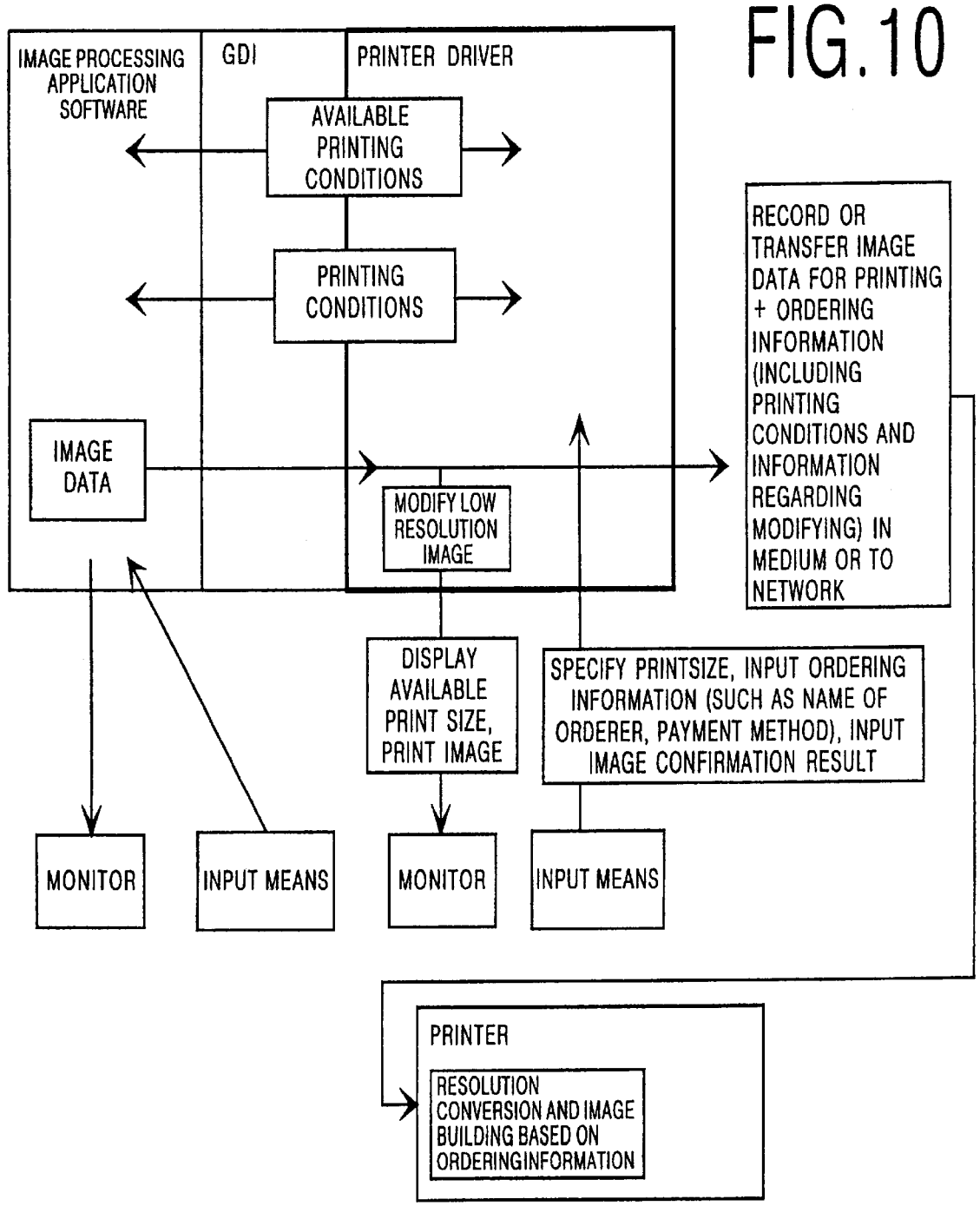
FIG. 10 is a block diagram showing an outline of processing by a printer driver in a third embodiment.
Figure 11:
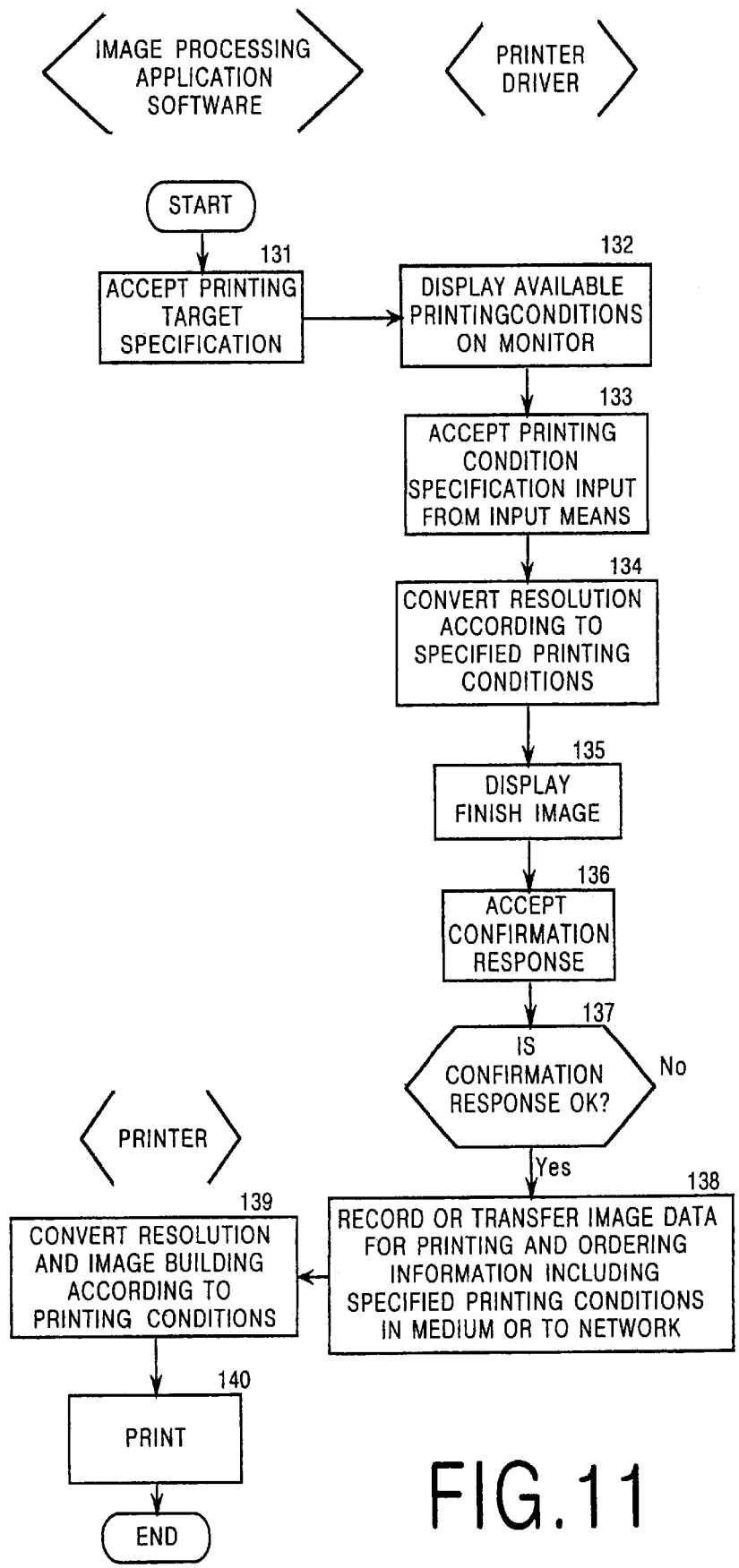
FIG. 11 is a flow chart showing the processing by the printer driver in the third embodiment.

FIG. 10 is a block diagram showing an outline of processing carried out in the third embodiment by a printer driver recorded in a recording medium of the present invention. FIG. 11 is a flow chart showing the processing. In the third embodiment, resolution conversion of image data in accordance with printing conditions is carried out by a printer, which is different from the first embodiment.

At a step 131, image processing application software accepts printing target specification input from input means such as a keyboard or a mouse, which is transferred to the printer driver. The printer driver displays on a monitor available printing conditions, as shown in FIG. 6 (step 132). The printer driver then accepts printing condition specification input (step 133). At the step 133, information regarding trimming or rotation of the image represented by the image data upon printing is also accepted as a portion of the printing conditions.

Once the specification input has been completed, the printing target image data are enlarged or reduced (step 134) according to the specified printing conditions, if trimming, rotation, or size fitting has been specified for the image data transferred from the image processing application software. On this occasion, image conversion can be carried out at a high speed by thinning out pixels of the image data so that the data amount becomes less.

The printer driver then displays image data 9 after the conversion and an image 10 of a print paper on a finish confirmation screen 8, as shown in FIG. 7 (step 135). The image data after the conversion has low resolution at which image pixels have been thinned out. However, the displayed image is used for finish confirmation only, and low resolution does not cause a problem here.

The customer inputs a confirmation response by using the input means while looking at the finish confirmation screen 8. On this occasion, the name of an orderer or a payment method may be input as well. The printer driver accepts this input (step 136), and judges whether or not the confirmation result is OK (step 137). If the conformation result is OK, the image data and ordering information including the specified printing conditions are recorded in a recording medium 2, or transferred to a network 3 (step 138). If the confirmation result is not OK, the processing goes back to the step 132 and the printing condition setting screen 7 is displayed so that the customer can specify again. The ordering information includes, as the printing conditions, information showing the magnification of the image data or the area of trimming if trimming has been carried out.

The ordering information and the image data are input to a photographic printer 5 via the network 3 or the recording medium 2. The photographic printer 5 converts the image data based on the ordering information. The resolution of the image data is converted (step 139) based on the magnification of the image data included in the printing conditions. Alternatively, if trimming has been specified, the area to be printed are extracted. The image data whose resolution has been converted (or the image data for the extracted area in the case of trimming) are printed according to the printing conditions (step 140).

Fourth Embodiment

A fourth embodiment of the present invention will be explained next.

Figure 12:
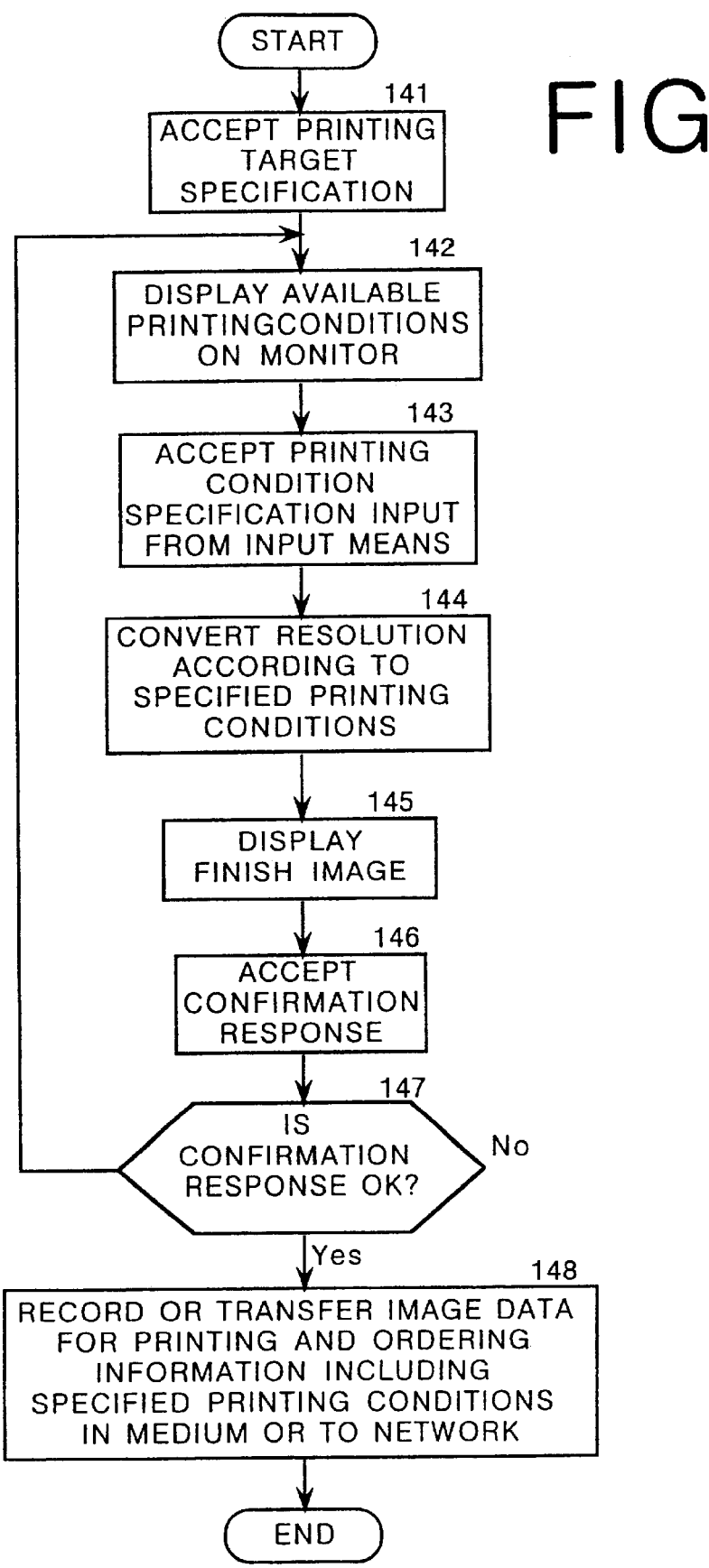
FIG. 12 is a flow chart showing processing by a printer driver in a fourth embodiment.

FIG. 12 is a flow chart showing processing carried out in the fourth embodiment by a printer driver recorded in a recording medium of the present invention. In the fourth embodiment, the printer driver accepts printing target specification, which is the difference from the first to third embodiments in the above.

At a step 141, printing target specification is accepted and available printing conditions are displayed on a monitor (step 142). Printing condition specification input is accepted from input means such as a keyboard or a mouse (step 143). Once the specification has been completed, the printer driver obtains image data for printing according to the specified printing conditions (step 144) by resolution conversion on the printing target image data, if size fitting has been specified, for example. If the image represented by the image data becomes blurry due to the resolution conversion, sharpness conversion may be carried out as well. Alternatively, color conversion or sharpness conversion may be carried out according to printer characteristics.

The printer driver then displays image data 9 for printing after the conversion and an image 10 of a print paper on a finish confirmation screen 8, as shown in FIG. 7 (step 145).

A customer inputs a confirmation response by using the input means while looking at the finish confirmation screen 8. On this occasion, the name of an orderer or a payment method may be input as well. The printer driver accepts this input (step 146), and judges whether or not the confirmation result is OK (step 147). If the conformation result is OK, the image data for printing and ordering information including the specified printing conditions are recorded in a recording medium 2, or transferred to a network 3 (step 148). If the confirmation result is not OK, the processing goes back to the step 142 and the printing condition setting screen 7 is displayed so that the customer can specify again.

What is claimed is:

1. A computer-readable recording medium including a photographic printer driver program which is executed to generate an ordering interface on a computer which enables entry of printing conditions in an order file that is transferred in addition to photograph image data to a photographic printer via a recording medium or a network to request a print output of the photograph image data, whereby based on the photograph printer driver program, a computer executes:

a printing condition specifying function for specifying printing conditions available to the photographic printer;

a printing condition displaying function which displays printing conditions available to the photographic printer on a display apparatus;

a printing condition selection accepting function which accepts a photographic printing condition selection from an input device; and a printing condition recording function which records the printing condition accepted by the printing condition selection accepting function as a portion of an order for printing photographs, wherein the computer that executes the photographic printer driver program is not connected to the photographic printer ultimately used to fulfill the print order while the photographic printer driver program is executed and, by executing the photographic printer driver program, prevents the input of printing conditions that are not supported by the photographic printer.

2. The computer-readable recording medium storing the photographic printer driver program according to claim 1, by which the computer further executes:

an image data converting function which converts, based on the printing conditions having been specified, the photograph image data so that the photograph image data become suitable for the printing conditions.

3. The computer-readable recording medium storing the photographic printer driver program according to claim 2, by which the computer further executes:

a finish confirmation function which enables confirmation of an anticipated finish image of photographic print by displaying photograph image data having been converted by the image data converting function with an image of a print paper overlapping the image data on a display apparatus.

4. The computer-readable recording medium storing the photographic printer driver program according to claim 3, by which the finish confirmation function displays on the display apparatus the photograph image data after the conversion by the image data converting function with the image of the print paper overlapping the image data, when recording or transfer of the image data and an order file describing the content of an order for printing the image data in a recording medium or to a network is ordered.

5. The computer-readable recording medium storing the photographic printer driver program according to claim 1, wherein specification of the size of a print paper is included as one of the printing conditions.

6. The computer-readable recording medium storing the photographic printer driver program according to claim 2, wherein specification of the size of the print paper is included as one of the printing conditions.

7. The computer-readable recording medium storing the photographic printer driver program according to claim 6, whereby the image data converting function converts resolution of the photograph image data so that the image represented by the image data fits in the specified print paper size.

8. The computer-readable recording medium storing the photographic printer driver program according to claim 1, wherein specification of whether or not a white margin is preferred around the periphery of photographic print is included as one of the printing conditions.

9. The computer-readable recording medium storing the photographic printer driver program according to claim 1, wherein the printing condition specifying function specifies the printing conditions before the transfer.

10. The computer-readable recording medium of claim 1, wherein the computer that executes the photographic printer driver program is not electronically interfaced with the photographic printer ultimately used to fulfill the print order while the photographic printer driver program is being executed.

11. The computer-readable recording medium storing the photographic printer driver program according to claim 3, wherein the photographic printer driver program further comprises:

a confirmation receiving function that receives a confirmation response from a user while the converted photograph image data is displayed.

12. The computer-readable recording medium storing the photographic printer driver program according to claim 4, wherein the photographic printer driver program further comprises:

a confirmation receiving function that receives a confirmation response from a user while the converted photograph image data is displayed.

13. The computer-readable recording medium storing the photographic printer driver program according to claim 11, wherein a user inputs ordering information and the confirmation response via an input device.

14. The computer-readable recording medium storing the photographic printer driver program according to claim 13, wherein the ordering information includes at least one of orderer name and payment method.

15. The computer-readable recording medium storing the photographic printer driver program according to claim 12, wherein a user inputs ordering information and the confirmation response via an input device.

16. The computer-readable recording medium storing the photographic printer driver program according to claim 15, wherein the ordering information includes at least one of orderer name and payment method.

17. A print ordering method performed by a computer having computer-readable recording medium including a photographic printer driver program which is executed to generate an ordering interface on a computer which enables entry of printing conditions in an order file that is transferred in addition to photograph image data to a photographic printer via a recording medium or a network to request a print output of the photograph image data, whereby based on the photograph printer driver program, the method executes the steps of:

specifying printing conditions available to the photographic printer;

displaying printing conditions available to the photographic printer on a display apparatus;

accepting a printing condition selection from an input device; and recording the accepted printing condition as a portion of an order for printing photographs, wherein the computer that executes the photographic printer driver program is not connected to the photographic printer ultimately used to fulfill the print order while the photographic printer driver program is executed and, by executing the photographic printer driver program, prevents the input of printing conditions that are not supported by the photographic printer.

18. The method of claim 17, by which the computer further converts, based on the printing conditions having been specified, the photograph image data so that the photograph image data become suitable for the printing conditions.

19. The method of claim 18, by which the computer further enables confirmation of an anticipated finish image of photographic print by displaying photograph image data having been converted with an image of a print paper overlapping the image data on a display apparatus.

20. The method of claim 19, wherein the confirmation is enabled by displaying the photographic image on the display apparatus after the conversion, with the image of the print paper overlapping the image data, when recording or transfer of the image data and an order file describing the content of an order for printing the image data in a recording medium or to a network is ordered.

21. The method of claim 17, wherein specification of the size of a print paper is included as one of the printing conditions.

22. The method of claim 18, wherein specification of the size of the print paper is included as one of the printing conditions.

23. The method of claim 22, wherein the convertion of the photograph image data comprises a conversion of resolution of the photographic image data so that the image represented by the image data fits in the specified print paper size.

24. The method of claim 17, wherein specification of whether or not a white margin is preferred around the periphery of photographic print is included as one of the printing conditions.

25. The method of claim 17, wherein the enabling of input of printing conditions comprises enabling of input of the printing conditions before the transfer.

26. The method of claim 17, wherein the computer that executes the photographic printer driver program is not electronically interfaced with the photographic printer ultimately used to fulfill the print order while the photographic printer driver program is being executed.

27. The method of claim 19, further comprising:
receiving a confirmation response from a user while the converted photograph image data is displayed.

28. The method of claim 20, further comprising:
receiving a confirmation response from a user while the converted photograph image data is displayed.

29. The method of claim 27, wherein a user inputs ordering information and the confirmation response via an input device.

30. The method of claim 29, wherein the ordering information includes at least one of orderer name and payment method.

31. The method of claim 28, wherein a user inputs ordering information and the confirmation response via an input device.

32. The method of claim 31, wherein the ordering information includes at least one of orderer name and payment method.

* * * * *

UNITED STATES PATENT AND TRADEMARK OFFICE
CERTIFICATE OF CORRECTION

PATENT NO.    : 6,278,528 B1
DATED         : August 21, 2001
INVENTOR(S)   : Shuichi Ohtsuka et al.

It is certified that error appears in the above-identified patent and that said Letters Patent is hereby corrected as shown below:

<u>Title page,</u>
Item [*] Notice:, please delete the phrase "This patent is subject to a terminal disclaimer."

Signed and Sealed this

Fourteenth Day of May, 2002

Attest:

*Attesting Officer*

JAMES E. ROGAN
*Director of the United States Patent and Trademark Office*